3,275,793
METHOD FOR ASSEMBLING CELL COMPONENTS IN STORAGE BATTERIES
Richard Frischkorn, West Lafayette, and Max E. Humes, Muncie, Ind., assignors to General Motors Corporation, Detroit, Mich., a corporation of Delaware
Filed June 9, 1965, Ser. No. 462,529
2 Claims. (Cl. 219—94)

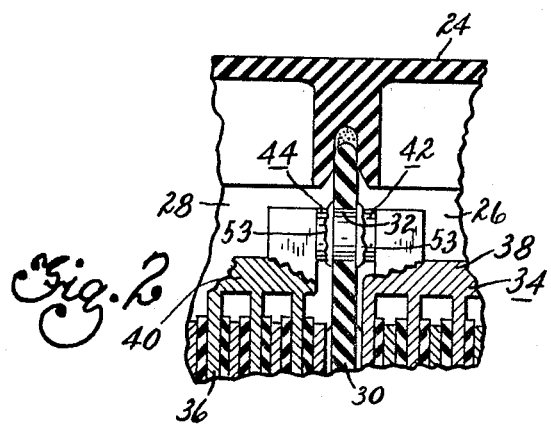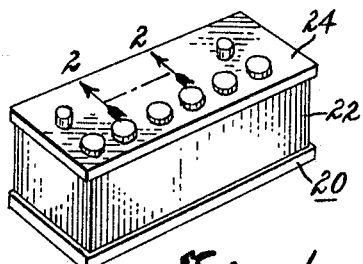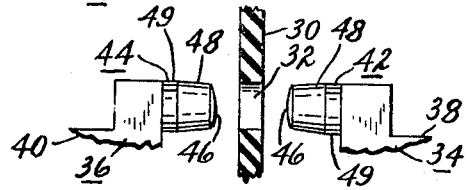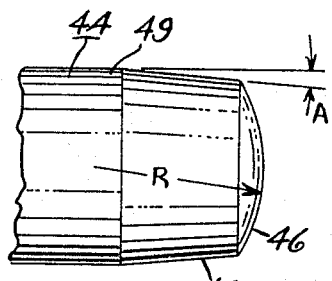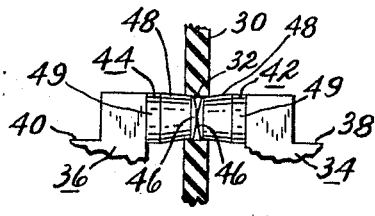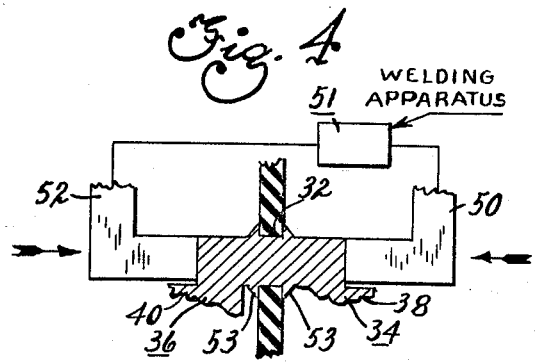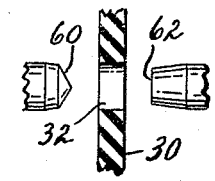
Sept. 27, 1966     R. FRISCHKORN ET AL     3,275,793
METHOD FOR ASSEMBLING CELL COMPONENTS IN STORAGE BATTERIES
Filed June 9, 1965
INVENTORS
RICHARD FRISCHKORN
MAX E. HUMES
BY
ATTORNEY United States Patent Office 3,275,793
Patented Sept. 27, 1966

This invention relates to storage batteries and is particularly concerned with methods for assembling cell components in storage batteries.

It is the main object of this invention to provide a method for electrically and mechanically connecting assembled cell groups in adjacent cells of a storage battery by means of through-the-wall connections which provide fluid tight junctions through the cell partitions.

Another object of the invention is to provide connector elements on assembled cell groups which are so dimensioned as to abut within an aperture through a cell partition when assembled from opposite sides thereof whereby the connector elements may be resistance welded with the simultaneous application of pressure from opposed directions to cause complete filling of the aperture and deformation of the connector elements at opposite sides of the partition wall whereby a fluid seal is obtained as well as a low resistance electrical connection.

In carrying out the above object it is still a further object to provide the opposed connector elements with non-mating end surfaces so that high resistance electrical connection results during initial phases of the welding operation whereby the weld and deformation of the connector elements is improved.

Another object of the invention is to maintain the pressure application at opposite sides of the dividing wall against the connector elements after the welding current has been eleminated and until the welded connection has cooled whereby a better fluid seal is obtained.

Further objects and advantages will be apparent, references being had to the accompanying drawings, wherein FIG. 1 is a view in perspective of a typical storage battery;

FIG. 2 is a fragmentary sectional view taken through the upper portion of adjacent cell compartments on line 2—2 of FIG. 1;

FIG. 3 is an expanded view showing the connector elements in position with respect to the dividing wall between two cells prior to insertion therein;

FIG. 4 is a view similar to FIG. 3 wherein the connector elements are in abutting position within the aperture in the wall;

FIG. 5 is a diagrammatic view showing welding electrodes electrically connected to a welding apparatus together with a means for applying pressure to the cell connectors for producing a welded joint therebetween;

FIG. 6 is an enlarged fragmentary view of an end of one of the connector elements; and FIG. 7 is a view similar to FIG. 3 showing a variation in design for the non-mating ends of the connector elements.

The use of through-the-wall connectors between adjacent cells of the lead-acid storage battery is fully disclosed in Patents 2,942,055 and 2,942,059, both assigned to the assignee of the present invention. In these patents, the through-the-wall connection is made mechanically prior to the time that the intercell connectors are welded to the cell groups. In the present invention, a deviation of this procedure is proposed wherein the cell groups and cell connectors are completely assembled externally of the battery box and wherein the groups are then placed within the cell compartments whereby the connectors fit into a preformed aperture in the compartment wall to contact one another. This is accomplished by springing the cell wall slightly whereby each connector element will snap into place within the aperture. Thereafter, the two connectors are welded together with the application of pressure to form a low resistance electrical path having a fluid tight connection with the dividing wall.

It is understood that the material of the intercell connectors is similar to that of the grids and is predominantly lead with or without small quantities of alloying ingredients such as antimony, etc. It is further understood that the composition of the material is of no importance here and that the welding equipment should be so adjusted as to provide the desired results with respect to the alloy being used.

Referring specifically to the drawings, FIG. 1 shows a battery at 20 having a case 22 and a cover 24. The case 22 includes a plurality of cell compartments therein, two of which—26 and 28—are shown in FIG. 2. The cell compartments are separated by means of a dividing wall 30 formed integrally with the case 22. The wall 30 is punched or otherwise operated upon to provide an aperture 32 therethrough adjacent the top thereof. With each cell compartment 26 and 28, etc., cell groups such as 34 and 36 are positioned which cell groups are complete with positive and negative plates usually provided with separators therebetween. The plates in each group 34 and 36 are connected by means of strap connectors designated at 38 and 40 which are burned onto the plates externally of the battery whereby preformed assemblies are formed. Each connector 38 and 40 includes a connector element 42 and 44 thereon. The ends of these connector elements are shown in detail in FIG. 6 wherein a rounded nose portion 46 is formed which merges with a tapered portion 48 that, in turn, blends into the main cylindrical portion 49 of the connector 42 or 44. The radius used on the surface 46 is sufficient so that when opposed connector elements meet, only point contact therebetween is initially obtained. This assures a high resistance path useful in the welding operation to follow.

In assembly of the cell groups 34 and 36 with the cell compartments 26 and 28, one cell group, for example 34, is first slipped into the compartment 26. Interference between the rounded end 46 of the connector element 42 occurs with the compartment wall 30 because of the critical dimension used. However, the wall 30 being relatively thin has some flexibility as does the cell group assembly whereby the assembly may be pressed downwardly until the rounded end 46 of the connector 38 snaps into the aperture 32 in the dividing wall to a position as shown in FIG. 4. The cell group 36 is next assembled by a similar procedure whereby when adjacent cell groups are in position the adjacent connectors 42 and 44 meet in abutting relation within the aperture in the wall 30 as shown in FIG. 4. Thereafter, a resistance welding fixture 51 is positioned against the ends of the connectors as shown in FIG. 5 wherein pressure elements 50 and 52 connected to opposite sides of the welding apparatus press against the cell connections 38 and 40, respectively. When the apparatus is energized, the welding current causes fusion of the rounded ends 46 of the abutting cell connectors. Welding current is supplied until the entire aperture 32 is filled with metal as shown in FIG. 5 to form a fluid tight junction and until the metal at the opposite sides of the dividing wall distorts as at 53 as shown in FIG. 5 and forms a fluid tight connection. At this point the welding apparatus is de-energized but the pressure application by the electrodes 50 and 52 is maintained until the welded joint has substantially cooled. Thereafter, the welding fixture is removed and the distorted portion 53 at opposite sides of the wall maintain a tight fluid connection therewith. This procedure is very important to the success of the invention since we have found that if the pressure application is removed prior to a substantial cooling there is a tendency for the distorted portions 53 at opposite sides of the dividing wall to be drawn apart whereby the final connection is not always fluid tight.

It is to be observed that the ends of the connectors 42 and 44 are of a non-mating character and in the preferred embodiment are identical curved surfaces 46. However, other non-mating surfaces such as shown in FIG. 7 may be used wherein one of the connectors may have a conical end 60 while the other connector may have a flat end 62, etc. Other configurations may also be used and in each instance high resistance is initially apparent at the juncture to facilitate the welding operation. We have found that welded connections between adjacent cells made in the manner described offer excellent electrical and physical properties whereby the cell groups are held tightly within the adjacent cells with the fluid tight connection therebetween. It is apparent that while the foregoing description is directed to a single cell connection that multiple cell connections for 3, 6, or 12 cell batteries, etc., may be made through following the same procedure.

A specific example of the welding technique used is as follows:

| | |
|---|---|
| Finished diameter of intercell connector | ⅜ in. |
| Thickness of dividing wall | .180–.200 in. |
| Composition of lead alloy | Approx. 96% lead/4% antimony or pure lead, etc. |
| Force applied by electrodes during welding operation | 400 lb. ±30. |
| Welding current | 7,000 to 10,000 amp. |
| Voltage | 3 to 5 volts. |
| Time of welding | 12 to 24 half cycles (60 cycles per second power supply). |

While the forms and embodiments of the present invention as herein disclosed constitute preferred forms, it is to be understood that other forms might be adapted.

What is claimed is as follows:

1. In a method for making a fluid tight, low resistance electrical connection through the dividing wall between two independent cell compartments of an electric storage battery, the steps comprising; providing a hole through the dividing wall between two independent cell compartments, providing opposed connector elements having tapered shanks and non-mating end portions wherein the diameter of said shanks permits limited entry of the shanks into said hole, entering said tapered shanks into said hole from opposite sides of said dividing wall so that the non-mating end portions thereof contact one another, applying force simultaneously from opposed directions to said shanks for causing said non-mating ends to contact one another, passing a welding current through the junction of the opposite ends of said shanks sufficient to cause resistance welding of said shanks one to another for forming a unitary electrical connection therebetween and substantially simultaneously causing said tapered shanks to seal against the walls of said hole and to distort within the hole for filling same and to deform at opposite sides of the wall for forming an additional seal thereagainst by maintaining said force application, eliminating said welding current and maintaining said force application at opposite ends of said shanks until the welded connection therebetween has cooled sufficiently to maintain the fluid tight seal with said wall.

2. In a method for making a fluid tight, low resistance electrical connection through a hole in the dividing wall between two independent cell compartments of an electric storage battery, the steps comprising; positioning a two part connector element within said hole from opposite sides thereof, means on each of said connector element parts to permit only its limited entry into said hole, applying force from opposite ends of said connector element while heating the same by means of a welding current for causing softening of said connector element and welding of the parts of said element while distorting the same sufficiently to fill tightly the hole with said connector material and to produce enlarged portions on said connector at opposite sides of said wall, and then de-activating the welding current while maintaining said application of force until the welded connector has cooled sufficiently to maintain the fluid tight seal with said wall.

References Cited by the Examiner

UNITED STATES PATENTS

| | | | |
|---|---|---|---|
| 555,131 | 2/1896 | Thomson | 219—150 |
| 2,327,924 | 8/1943 | Mounts | 85—37 |

RICHARD M. WOOD, *Primary Examiner.*